United States Patent
Isler

(10) Patent No.: US 12,394,561 B2
(45) Date of Patent: Aug. 19, 2025

(54) METHOD FOR MEASURING A QUANTITY OF LIQUID IN A LIQUID-INSULATED ELECTRICAL COMPONENT, LIQUID-INSULATED ELECTRICAL COMPONENT AND RAILROAD VEHICLE HAVING THE SAME

(71) Applicant: Hitachi Energy Ltd, Zürich (CH)

(72) Inventor: Stephane Isler, Faucigny (FR)

(73) Assignee: Hitachi Energy Ltd, Zürich (CH)

( * ) Notice: Subject to any disclaimer, the term of this patent is extended or adjusted under 35 U.S.C. 154(b) by 939 days.

(21) Appl. No.: 17/614,297

(22) PCT Filed: May 27, 2020

(86) PCT No.: PCT/EP2020/064767
§ 371 (c)(1),
(2) Date: Nov. 24, 2021

(87) PCT Pub. No.: WO2020/239872
PCT Pub. Date: Dec. 3, 2020

(65) Prior Publication Data
US 2022/0254564 A1    Aug. 11, 2022

(30) Foreign Application Priority Data

May 29, 2019    (EP) .................................... 19177321

(51) Int. Cl.
*H01F 27/32*    (2006.01)
*B61C 3/00*    (2006.01)
(Continued)

(52) U.S. Cl.
CPC ............ *H01F 27/321* (2013.01); *B61C 3/00* (2013.01); *G01F 22/02* (2013.01); *G01F 23/14* (2013.01);
(Continued)

(58) Field of Classification Search
CPC ................. H01F 27/321; H01F 27/402; H01F 2027/404; B61C 3/00; G01F 22/02; G01F 23/14; B61L 15/0081
(Continued)

(56) References Cited

U.S. PATENT DOCUMENTS 5,691,706 A    11/1997  Butler et al.
7,082,821 B2 *   8/2006  Chen ....................... E21B 44/00
                                                              73/152.43
(Continued)

FOREIGN PATENT DOCUMENTS

CN    104849001 A    8/2015
CN    105590744 A    5/2016
(Continued)

OTHER PUBLICATIONS

Oglesby W., "A Comparative Analysis: Volume and Mass Derived from Tank Gauging Systems", 1989, Advances in Instrumentation and Control, 44, pp. 1493-1504 (Year: 1989).*
(Continued)

*Primary Examiner* — S. Joseph Morano
*Assistant Examiner* — Heaven R Buffington
(74) *Attorney, Agent, or Firm* — Sage Patent Group

(57) ABSTRACT

An aspect of the present disclosure provides a method for measuring a quantity of liquid in a liquid-insulated electrical component. The liquid-insulated electrical component includes a main tank and an expansion tank fluidly connected to the main tank. The method includes measuring a first pressure of the liquid at a first point in the main tank, measuring a second pressure of the liquid at a second point in the main tank, the second point being at a height above the first point, measuring a third pressure of the liquid at a third point in the expansion tank, and determining the quantity of liquid in the liquid-insulated electrical component based on (Continued)

the first pressure, the second pressure and the third pressure. Further aspects provide a liquid-insulated electrical component, particularly a transformer, more particularly a traction transformer for a railroad vehicle, as well as a railroad vehicle including said liquid-insulated electrical component.

20 Claims, 2 Drawing Sheets

(51) Int. Cl.
  *G01F 22/02* (2006.01)
  *G01F 23/14* (2006.01)
  *H01F 27/40* (2006.01)
  *B61L 15/00* (2006.01)
(52) U.S. Cl.
  CPC ........ *H01F 27/402* (2013.01); *B61L 15/0081* (2013.01)
(58) Field of Classification Search
  USPC ...................... 105/60; 702/50, 55; 73/861.42
  See application file for complete search history.

(56) References Cited

U.S. PATENT DOCUMENTS

| | | | | |
|---|---|---|---|---|
| 8,400,320 B2 * | 3/2013 | Santos | .................. | G01F 23/185 340/622 |
| 9,377,341 B1 | 6/2016 | Watson | | |
| 2011/0156918 A1 | 6/2011 | Santos | | |
| 2014/0305201 A1 | 10/2014 | Watson | | |
| 2017/0186524 A1 * | 6/2017 | Stefanutti | .......... | H01F 27/2876 |
| 2018/0283924 A1 | 10/2018 | Kulczyk | | |

FOREIGN PATENT DOCUMENTS

| | | |
|---|---|---|
| CN | 105826043 A | 8/2016 |
| CN | 206210538 U | 5/2017 |
| CN | 207248448 U | 4/2018 |
| CN | 108666098 A | 10/2018 |
| JP | 2015046458 A | 3/2015 |

OTHER PUBLICATIONS

First Office Action for Chinese Invention Patent Application No. 2020800393409, mailed Jul. 8, 2023, 3 pages.
International Search Report and Written Opinion of the International Searching Authority, PCT/EP2020/064767, mailed Jul. 24, 2020, 16 pages.
Oglesby, Woodrow, "A Comparative Analysis: Volume and Mass Derived from Tank Gauging Systems," Advances in Instrumentation and Control, 44, Part 4, 1989, pp. 1493-1504.
Mandelkehr, Larry et al., "Hydrostatic Tank Gauging: Where is it best applied?", Advances in Instrumentation and Control, 44, Part 4, 1989, pp. 1505-1516.
Extended European Search Report dated Nov. 19, 2019 for European Patent Application No. 19177321.7, 8 pages.
1 Indian Examination Report dated Mar. 17, 2022 for Indian Patent Application No. 202147054123, 5 pages.

\* cited by examiner

METHOD FOR MEASURING A QUANTITY OF LIQUID IN A LIQUID-INSULATED ELECTRICAL COMPONENT, LIQUID-INSULATED ELECTRICAL COMPONENT AND RAILROAD VEHICLE HAVING THE SAME

CROSS-REFERENCE TO RELATED APPLICATIONS

This application is a 35 U.S.C. § 371 national stage application of PCT International Application No. PCT/EP2020/064767 filed on May 27, 2019, which in turns claims foreign priority to European Patent Application No. 19177321.7, filed on May 29, 2019, the disclosures and content of which are incorporated by reference herein in their entirety.

FIELD OF THE DISCLOSURE

Embodiments of the present disclosure generally relate to a method for measuring a quantity of liquid in a liquid-insulated electrical component, particularly in a liquid-insulated transformer. The liquid-insulated electrical component may be a traction transformer for a railroad vehicle. A further embodiment of the present disclosure relates to a railroad vehicle having a liquid-insulated traction transformer.

TECHNICAL BACKGROUND

Electric railroad vehicles include one or more traction transformers for supplying electrical power to one or more traction motors. Typically, traction transformers are housed in a tank filled with insulating liquid, and are thermally cooled and electrically insulated by being submerged in the liquid. An expansion tank is provided to allow for expansion and contraction of the liquid caused by changes in temperature. In normal operation, the windings of the traction transformer are completely submerged in insulating liquid so that arcing between the windings and other components, such as the casing, are prevented.

A common failure mode for liquid-insulated transformers is due to insufficient quantity of liquid. Failure of tank welds, gaskets, pipes, hoses or fittings may cause a leak. When the liquid quantity is too low, a portion of the windings may be exposed from the liquid, and the exposed portion of the windings would then be insulated with air instead of liquid. In this situation, arcing between the windings and other components can occur. To prevent such failures from occurring, traction transformers are typically fitted with level sensors for detecting the level of liquid in the transformer. Such level sensors may provide a number of thresholds, such as a "low" threshold for providing a warning signal and a "critical" threshold for opening a main circuit breaker to prevent arcing. However, level sensors in the current state of the art have several drawbacks, as the volume of the liquid (and hence the level of the liquid) is heavily dependent on its temperature.

In view thereof, it is to provide a method and apparatus for measuring a quantity of liquid accurately and reliably.

SUMMARY OF THE DISCLOSURE

A first aspect of the present disclosure provides a method for measuring a quantity of liquid in a liquid-insulated electrical component. The liquid-insulated electrical component includes a main tank and an expansion tank fluidly connected to the main tank. The method includes measuring a first pressure of the liquid at a first point in the main tank, measuring a second pressure of the liquid at a second point in the main tank, the second point being at a height above the first point, measuring a third pressure of the liquid at a third point in the expansion tank, and determining the quantity of liquid in the liquid-insulated electrical component based on the first pressure, the second pressure and the third pressure.

A second aspect of the present disclosure further provides a liquid-insulated electrical component comprising a main tank containing the electrical component, an expansion tank fluidly connected to the main tank, a first pressure sensor provided in the main tank and configured for measuring a first pressure of the liquid, a second pressure sensor provided in the main tank and configured for measuring a second pressure of the liquid, the second pressure sensor provided at a height above the first pressure sensor, a third pressure sensor provided in the expansion tank for measuring a third pressure of the liquid, and a determination unit configured for implementing the method for measuring a quantity of liquid according to the first aspect.

A third aspect of the present disclosure further provides a liquid-insulated electrical component according to the second aspect, wherein the liquid-insulated electrical component is a transformer, particularly a traction transformer for a railroad vehicle.

A fourth aspect of the present disclosure further provides a railroad vehicle including the liquid-insulated electrical component according to the third aspect.

The embodiments described in the present disclosure allow for measuring a quantity of liquid in the liquid-insulated electrical component accurately and reliably. Particularly, the embodiments described herein take into account the change in volume of the liquid in the liquid-insulated electrical component caused by temperature fluctuations in operation. Further, the embodiments described herein allow for more cost-effective maintenance and operation of a railroad vehicle having a liquid-insulated component, such as a liquid-insulated traction transformer.

Further advantages, features, aspects and details that can be combined with embodiments described herein are evident from the dependent claims, claim combinations, the description and the drawings.

BRIEF DESCRIPTION OF THE FIGURES

The details will be described in the following with reference to the figures, wherein.

DETAILED DESCRIPTION OF THE FIGURES AND OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can be applied to a corresponding part or aspect in another embodiment as well.

Railroad vehicles may be required to operate in a wide range of ambient temperatures from −50° C. to 45° C. However, due to electrical losses, the temperature of the insulating liquid in a traction transformer during operation may be significantly higher, typically 60° C. to 100° C., and the liquid volume during operation may be higher than the liquid volume at ambient temperature. A leak may originate when the traction transformer is in operation, at a time when the liquid temperature is hot, and may be undetected by a conventional level measuring system due to the higher volume of the higher-temperature liquid. When the railroad vehicle is stopped at a station or siding, the liquid temperature subsequently decreases, upon which time the liquid volume also decreases, causing the level to drop significantly and potentially causing the transformer windings to be exposed. The level measuring system may then detect a "critical" level of liquid, automatically disconnecting the main circuit breaker and freezing the railroad vehicle in its place.

Due to the above drawbacks, an accurate measurement and monitoring of the quantity of liquid in a traction transformer is difficult to achieve. Thus, operators may organize frequent visual inspections of the traction transformer tanks to ensure that a leak has not occurred, which results in significant maintenance costs.

Several methods in the current state of the art can be used to measure a quantity of liquid in a traction transformer. One method is to measure a volume of liquid using, for example, a float sensor, or a capacitive sensor installed at a predetermined level in the tank. However, measuring the liquid volume is not reliable as variations in density due to temperature fluctuations are not accounted for, and the measured volume of liquid may fluctuate at any time during operation.

Figure 1:
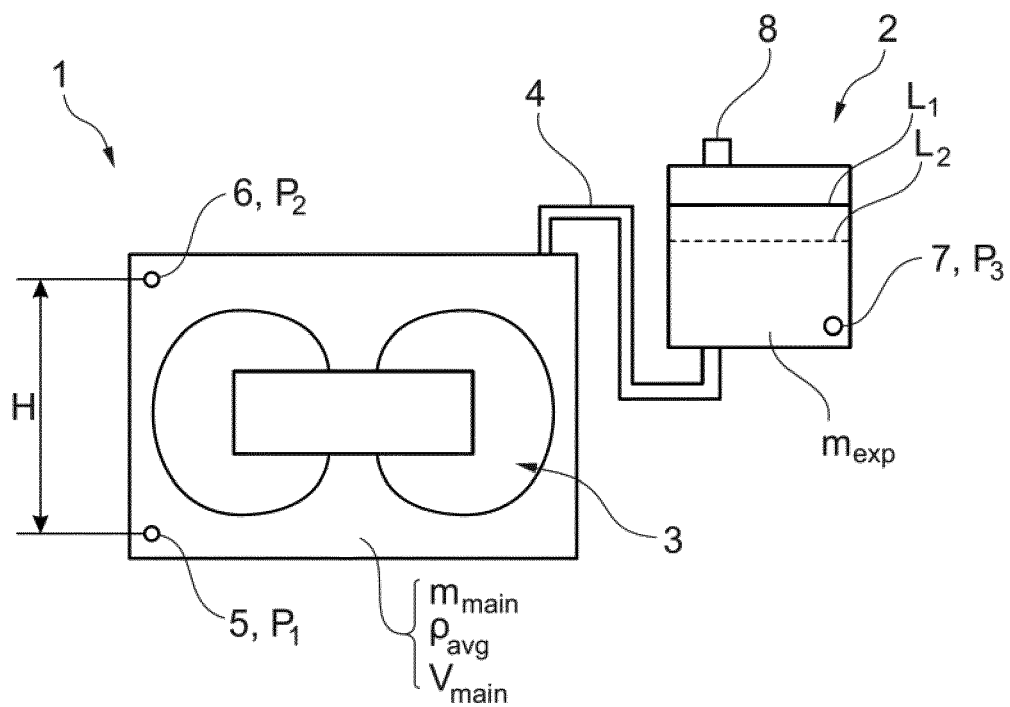
FIG. 1 is a schematic cross-sectional view of a liquid-insulated electrical component according to aspects of the present disclosure.

The present disclosure relates primarily to a liquid-insulated electrical component, particularly a liquid-insulated transformer. Reference is made to FIG. 1, which shows a schematic side view of a liquid-insulated electrical component. An electrical component 3 is positioned within a main tank 1, and the main tank 1 is filled with an insulating liquid such that the entirety of the electrical component 3 is submerged within the insulating liquid. Being submerged within the insulating liquid allows for the electrical insulation between, for example, the electrical component 3 and the main tank 1 to be controlled and for arcing to be suppressed.

In the context of the present disclosure, the terms "liquid" and "insulating liquid" may refer to any liquid which is used to electrically insulate an electrical component. Other types of insulation of electrical components exist in the state of the art, such as dry insulation alternatives; however non-liquid insulation solutions do not lie within the scope of the present disclosure. For example, the insulating liquid may comprise oil, particularly one of the group containing mineral-based oil, ester-based oil or silicon-based oil. However, the present disclosure is not limited thereto. The liquid of the present disclosure may comprise any liquid deemed suitable for electrically insulating an electrical component.

Main tank 1 of the liquid-insulated electrical component is provided to surround the electrical component 3 and to hold a sufficient quantity of insulating liquid so as to submerge the electrical component 3. Main tank 1 may be constructed in any way known in the art for containing the insulating liquid and the electrical component. For example, main tank 1 may be formed from a metal, plastic or composite material. Particularly, main tank 1 may be manufactured from sheet metal components welded together to form a sealed tank. Main tank 1 may further include a liner provided on the inner wall of main tank 1.

The dielectric performance of the liquid-insulated electrical component is heavily dependent on the insulating liquid maintaining the electrical component 3 in a submerged state in the main tank 1. Should the level of insulating liquid decline to a level where the electrical component 3 is exposed to air, the insulating liquid can no longer prevent arcing between the electrical component 3 and, for example, the main tank 1. This is a common failure mode of a liquid-insulated electrical component, in particular a liquid-insulated transformer.

However, a variable level of insulating liquid is typically unavoidable due to the temperature fluctuations of the liquid-insulated electrical component, and hence the insulating liquid, when in operation. The electrical component 3 may typically be a source of heat which causes the insulating liquid to rise in temperature during operation. For example, in the case where electrical component 3 is a transformer, electrical losses in the transformer may be expelled to the surrounding insulating liquid as heat. Heating the insulating liquid causes its volume to increase, and inversely, allowing the insulating liquid to cool causes its volume to decrease.

In addition to volume fluctuations of the insulating liquid, during normal operation over the lifetime of the liquid-insulated electrical component, a leak may develop such that insulating liquid leaks from the liquid-insulated electrical component. This is particularly relevant when main tank 1 is formed by welding, as cyclic expansion and contraction of the welded structure may cause the welds to fatigue and fail, generating a source of leakage. Typically, leakages may only be detected in one of two ways—by inspecting the liquid-insulated electrical component during preventative maintenance, or by using level sensors to detect a low or critical level of liquid. However, rigorous inspection increases operation and maintenance costs, and using level sensors only allows for detecting of a large leak at a time well after the leak initially occurs. Since the transformer cannot be operated until additional liquid is added to the tank, costly operational delays may occur.

In order to accommodate for fluctuations in liquid volume, the liquid-insulated electrical component includes at least one expansion tank 2. Expansion tank 2 is fluidly connected to main tank 1 via hose 4. In the context of the present disclosure, any number of expansion tanks 2 may be fluidly connected to main tank 1. Expansion tank 2 may further include a breather 8 to allow for the equalization of pressure during expansion and contraction of the insulating liquid. Similarly as for main tank 1, expansion tank 2 may be constructed in any way known in the art for containing the insulating liquid. For example, expansion tank 2 may be formed from a metal, plastic or composite material. Particularly, expansion tank 2 may be manufactured from sheet metal components welded together to form a sealed tank. Expansion tank 2 may further include a liner provided on the inner wall of expansion tank 2.

During operation of the liquid-insulated electrical component, insulating liquid contained in main tank 1 may be heated by the heat generated by electrical component 3. The insulating liquid subsequently expands, and the expanding insulating liquid flows through hose 4 and into expansion tank 2. As exemplarily shown in FIG. 1, the level of liquid in the liquid-insulated electrical component at an operating temperature may be at a level denoted by $L_1$. During operation, the temperature of the insulating liquid may vary, and the level L of liquid in the liquid-insulated electrical component subsequently varies. As exemplarily shown in FIG. 1, the level of liquid in the liquid-insulated electrical component at a lower temperature, for example when the liquid-insulated electrical component is not in operation and has subsequently cooled to an ambient temperature, may be at a lower level denoted by $L_2$.

It is evident from the above discussion and from what is exemplarily shown in FIG. 1 that measuring a quantity of liquid in the liquid-insulated electrical component by using level sensors, either in main tank 1 or in expansion tank 2, can be problematic and unreliable. Even when no leakage occurs, the variation between, for example, a level of liquid $L_1$ at which the liquid-insulated electrical component is in operation and a level of liquid $L_2$ at which the liquid-insulated electrical component has cooled is substantial. A quantity of liquid corresponding to level $L_1$ during operation which is sufficient to maintain electrical component 3 in a submerged state may not be sufficient after the insulating liquid has cooled and contracted. Further, as discussed above, solutions in the current state of the art involving measurement of the oil temperature and/or measurement of an air flow rate into and out of the system can be unreliable.

In an effort to transition from a preventive maintenance strategy to a predictive maintenance strategy, a solution for detecting leakages by measuring the quantity of liquid while also taking into account the effects of temperature fluctuation has been devised. Embodiments of the present disclosure allow for more accurate and reliable measurement of the quantity of liquid present in the liquid-insulated component. To overcome the shortcomings of measuring a liquid level, the present disclosure uses a number of pressure sensors to determine the quantity of liquid.

According to an embodiment of the present disclosure, a method for measuring a quantity of liquid in a liquid-insulated electrical component is provided. The liquid-insulated electrical component includes a main tank 1 and an expansion tank 2 fluidly connected with the main tank 1. The method includes measuring a first pressure $P_1$ at a first point in the main tank 1, measuring a second pressure $P_2$ at a second point in the main tank 1, the second point being at a height H above the first point, measuring a third pressure $P_3$ at a third point in the expansion tank 2, and determining the quantity of liquid in the liquid-insulated electrical component based on the first pressure $P_1$, the second pressure $P_2$ and the third pressure $P_3$.

As exemplarily shown in FIG. 1, the liquid-insulated electrical component is provided with a first pressure sensor 5 and a second pressure sensor 6. First pressure sensor 5 is configured for measuring first pressure $P_1$, and second pressure sensor 6 is configured for measuring second pressure $P_2$. The point at which first pressure sensor 5 is positioned is hereafter referred to as the first point, and the point at which the second pressure sensor 6 is provided is hereafter referred to as the second point.

In the context of the present disclosure, first pressure $P_1$ and second pressure $P_2$ may be measured as either absolute pressures or relative pressures. That is, first pressure $P_1$ and second pressure $P_2$ may be absolute pressures, or first pressure $P_1$ and second pressure $P_2$ may be relative pressures. In the case of first pressure $P_1$ and second pressure $P_2$ being relative pressures, the reference pressure may be the ambient pressure at a point outside of main tank 1. In determining a quantity of liquid according to the present disclosure, the difference between $P_1$ and $P_2$ is determined, therefore it is of no consequence whether first pressure $P_1$ and second pressure $P_2$ are absolute pressures or relative pressures. It leads that first pressure sensor 5 and second pressure sensor 6 may be configured for measuring an absolute pressure, or a relative pressure.

In the context of the present disclosure, third pressure $P_3$ may be measured as a relative pressure. Particularly, third pressure $P_3$ may be measured as a pressure relative to the pressure of air in a top portion of expansion tank 2. Alternatively, third pressure $P_3$ may be measured as a pressure relative to an ambient pressure at a point outside of expansion tank 2. It leads that third pressure sensor 7 may be configured to measure a relative pressure. Particularly, third pressure sensor 7 may be configured to measure a pressure relative to the pressure of air in a top portion of expansion tank 2, or relative to an ambient pressure at a point outside of expansion tank 2.

Using the values of first pressure $P_1$, second pressure $P_2$ and third pressure $P_3$, a quantity of liquid in the liquid-insulated electrical component can be determined. The following disclosure outlines a number of methods for determining the quantity of liquid. For a substantially incompressible liquid, and assuming that the liquid is in a hydrostatic state, the hydrostatic pressure P at a point at the base of a column of liquid is provided by equation (1) below, and the mass of liquid m in the column of liquid is provided by equation (2) below:

$$P = \rho \times g \times h \quad (1)$$

$$m = \rho \times h \times A \quad (2)$$

where $\rho$ is the average density of the liquid, g is acceleration due to gravity of approximately 9.81 m/s², h is the height of the column of liquid, and A is the area of the column of liquid. Combining equations (1) and (2) allow for the mass of liquid m to be determined as a function of pressure P as shown below in equation (3):

$$m = P \times (A/g) \quad (3)$$

According to an embodiment, which may be combined with other embodiments described herein, the quantity of liquid may be based on at least one of a total mass of liquid ($m_{total}$), a mass of liquid in the expansion tank ($m_{exp}$), a mass of liquid in the main tank ($m_{main}$) and an average density of liquid in the main tank ($\rho_{avg}$).

Equation (1) above can be used to determine the average density of liquid in main tank 1. Main tank 1 is provided with first pressure sensor 5 and second pressure sensor 6, which are configured for measuring first pressure $P_1$ at the first point and second pressure $P_2$ at the second point, respectively. The second point is provided at a height H above the first point. Combining two instances of equation (1) arrives at equation (4) below for determining the average density of liquid in the main tank $\rho_{avg}$:

$$\rho_{avg} = (P_2 - P_1)/(g \times H) \quad (4)$$

The average density of liquid $\rho_{avg}$ determined by equation (4) corresponds to the average density of liquid in the column of liquid between the first point and the second point. The first point and the second point may be provided at points which do not correspond with the bottom of main tank 1 and the top of main tank 1, respectively. In this case, when the insulating fluid is assumed to be incompressible and homogeneous, the average density of liquid between the first point and the second point approximately corresponds to the average density of liquid in the main tank $\rho_{avg}$ across the entire height of main tank 1.

Equations (2) and (4) can therefore be combined to determine the mass of liquid in the main tank $m_{main}$ as provided by equation (5) below:

$$m_{main} = V_{main} \times (P_2 - P_1)/(g \times H) \quad (5)$$

where $V_{main}$ is the volume of main tank 1, particularly the volume of insulating liquid that main tank 1 is capable of containing around electrical component 3.

Equation (3) above can be implemented to determine a mass of liquid in expansion tank 2. Expansion tank 2 is provided with third pressure sensor 7 which is configured for measuring third pressure $P_3$ at the third point. Therefore, the mass of liquid $m_{exp}$ in expansion tank 2 above the third point can be determined by equation (6):

$$m_{exp} = P_3 \times (A_{exp}/g) \quad (6)$$

where $A_{exp}$ is the plan cross-sectional area of expansion tank 2. In the case where the third point is provided at the base of expansion tank 2, i.e. at a point where no liquid in expansion tank 2 is beneath the third point, then the mass of liquid $m_{exp}$ in expansion tank 2 provided by equation (6) is substantially equal to the total mass of liquid in expansion tank 2.

Combining equations (5) and (6) above allows for determining the total mass of liquid in the liquid-insulated component using equation (7) below:

$$m_{total} = m_{main} + m_{exp} = V_{main} \times (P_2 - P_1)/(g \times H) + P_3 \times (A_{exp}/g) \quad (7)$$

In order to further simplify the determination of the quantity of liquid in the liquid-insulated electrical component, the known constants of equation (7) can be generalized into predetermined parameters $\alpha$, $\beta$ which may take into account constants and the geometries of the main tank and the expansion tank, i.e. $V_{main}$, H and $A_{exp}$. Such predetermined parameters $\alpha$, $\beta$ could further include a conversion factor for converting into a generic total quantity of liquid value $Q_{total}$ which corresponds to a generalized quantity of liquid in the liquid-insulated electrical component. Thus, the generic total quantity of liquid $Q_{total}$ can be expressed as the following equation (A):

$$Q_{total} = \alpha \times P_3 + \beta \times (P_2 - P_1) \quad (A)$$

where $\alpha$ and/or $\beta$ are predetermined values. For example, $\alpha$ may correspond to a predetermined value based on the geometry of the expansion tank, i.e. $A_{exp}$ and $\beta$ may correspond to a predetermined value based on the geometry of the main tank, i.e. H and $V_{main}$.

Predetermined values $\alpha$, $\beta$ may include a conversion factor such that the generic total quantity of liquid $Q_{total}$ corresponds to a specific quantity of liquid. For example, predetermined values $\alpha$, $\beta$ may include a conversion factor for determining one of a total mass of liquid in the liquid-insulated electrical component, a height of liquid in the expansion tank, or a volume of liquid in the liquid-insulated electrical component. However, the present disclosure is not limited thereto. For example, when determining the total mass of liquid in the liquid-insulated component, predetermined values for determining total mass $\alpha_m$, $\beta_m$ may be set such that:

$$\alpha_m = A_{exp}/g \text{ and } \beta_m = V_{main}/(g \times H)$$

such that the total mass of liquid in the liquid-insulated component is determined with the following equation (8):

$$m_{total} = \alpha_m \times P_3 + \beta_m \times (P_2 - P_1) \quad (7)$$

Generally, first pressure sensor 5 and second pressure sensor 6 may be provided at any vertical height in main tank 1. The average density $\rho_{avg}$ of the column of insulating liquid between the first point and the second point can be determined between any two points in main tank 1, provided the height H between the first and second points is known. However, the accuracy of determining the average density $\rho_{avg}$ can be further improved.

According to an embodiment, which may be combined with other embodiments described herein, the first point may be provided at the base of main tank 1 or the second point may be provided at the top of main tank 1. Particularly, the first point may be provided at the base of main tank 1 and the second point may be provided at the top of main tank 1. The term "provided at the base" refers to a position as reasonably close to the base of main tank 1 as possible. The point referred to as "at the base" may be on a floor portion of main tank 1, or on a side wall portion of main tank 1 substantially close to a floor portion of main tank 1. Particularly, the first point may be in the bottom 10% of the vertical height of main tank 1, more particularly in the bottom 5% of the vertical height of main tank 1. Similarly, the term "provided at the top" refers to a position as reasonably close to the top of the main tank as possible. The point referred to as "at the top" may be on a roof portion of main tank 1, or on a side wall portion of main tank 1 substantially close to a roof portion of main tank 1. Particularly, the second point may be in the top 10% of the vertical height of main tank 1, more particularly in the top 5% of the vertical height of main tank 1.

Providing the first point at the base of main tank 1 or the second point at the top of main tank 1 allows for measuring the pressure difference ΔP across a larger column of insulating liquid. Particularly, providing the first point at the base of main tank 1 and the second point at the top of main tank 1 allows for measuring the pressure difference across the largest practical column of insulating liquid in main tank 1. Localized variations in temperature of the insulating liquid, and hence density, can therefore be compensated for by determining the average density $\rho_{avg}$ over a larger column of insulating liquid. Thereby, a more accurate estimate of the average density $\rho_{avg}$ of the insulating liquid in main tank 1 can be achieved.

Third pressure sensor 7 may be provided at any height in expansion tank 2, provided that third pressure sensor 7 is submerged in insulating fluid during normal operation. In other words, the third point may be provided at any point in the expansion tank below an expected minimum liquid level. Any insulating fluid in expansion tank 2 which is below the third point may be considered to be "redundant liquid", which is not considered when determining the quantity of liquid in the liquid-insulated electrical component. However, this "redundant liquid" leads to excess mass of insulating liquid in the liquid-insulated electrical component, and the mass of insulating liquid in the liquid-insulated electrical component can be further reduced.

According to an embodiment, which may be combined with other embodiments described herein, the third point may be provided at the base of expansion tank 2. The term "provided at the base" refers to a position as reasonably close to the base of expansion tank 2 as possible. The point referred to as "at the base" may be on a floor portion of expansion tank 2, or on a side wall portion of expansion tank 2 substantially close to a floor portion of expansion tank 2. Particularly, the third point may be in the bottom 10% of the vertical height of expansion tank 2, more particularly in the bottom 5% of the vertical height of expansion tank 2.

Providing the third point at the base of expansion tank 2 minimizes the amount of "redundant liquid" contained in the expansion tank below the third point. Thus, the mass of insulating liquid can be reduced, and the total mass of the liquid-insulated electrical component can be reduced, which may further lead to a reduction in operating costs.

According to an embodiment, which may be combined with other embodiments described herein, the method for measuring a quantity of liquid further includes filtering the at least one of the first pressure $P_1$, second pressure $P_2$ the third pressure $P_3$, and the quantity of liquid using a low-pass filter. Particularly, the low-pass filter is an infinite impulse response (IIR) filter or a finite impulse response (FIR) filter.

The liquid-insulted electrical component may be subjected to a range of frequency-based disturbances during operation. For example, the liquid-insulated electrical component may be subjected to mechanical vibrations or stray electrical fields. Such disturbances may cause signal disturbances in the values measured by pressure sensors 5, 6, 7 when measuring the pressures $P_1$, $P_2$, $P_3$ to determine the quantity of liquid. Typically, the frequency of these disturbances are of a significantly higher frequency than the rate of change of the pressures $P_1$, $P_2$, $P_2$ being measured. Therefore, such disturbances can be filtered through the use of a low-pass filter, so that the signals provided by pressure sensors 5, 6, 7 are reliable and accurate. Particularly, the low-pass filter may include at least one of an infinite impulse response (IIR) filter and a finite impulse response (FIR) filter. An IIR filter may be advantageous over an FIR filter as IIR filters may require fewer computational resources to execute a similar filtering operation, and can carry out a filtering operation faster than an FIR filter. Although IIR filters are disadvantaged by a non-linear phase response, the signals being filtered are not periodic and the representative frequency is low, thereby negating these disadvantages. Alternatively, the ease of implementing an FIR filter may be desirable.

Figure 2:
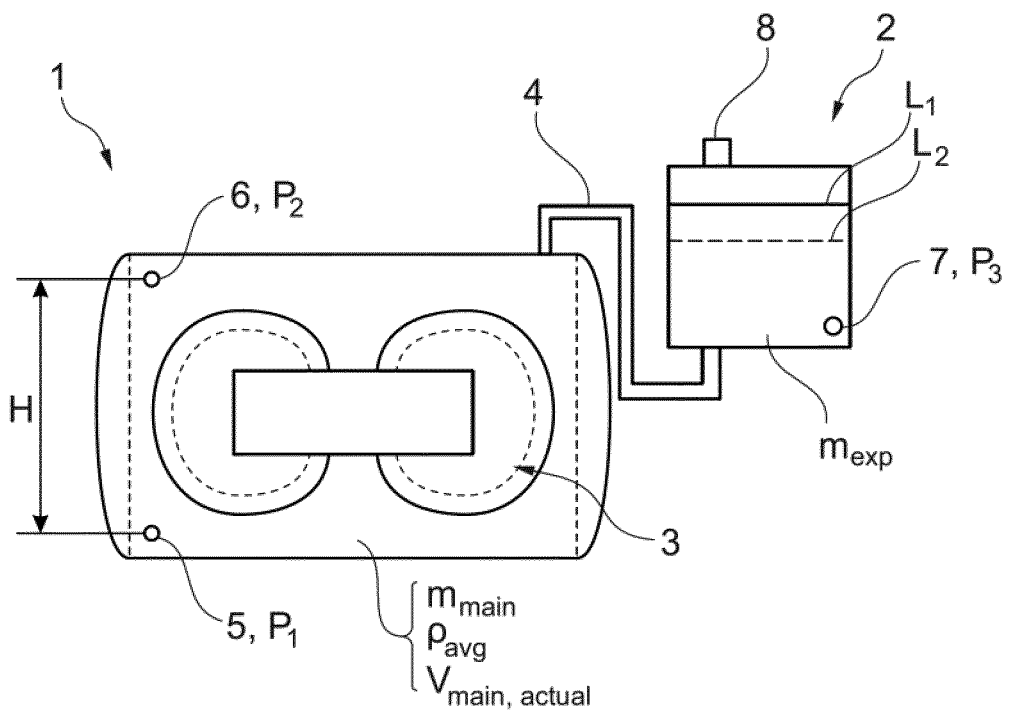
FIG. 2 is a schematic cross-sectional view of a liquid-insulated electrical component having a variable main tank volume according to aspects of the present disclosure.

The methods for measuring a quantity of liquid described above have so far assumed that the volume of main tank 1 remains constant. More specifically, that the volume of insulating liquid that main tank 1 is capable of containing around electrical component 3 remains constant. However, due to the heating and cooling of electrical component 5 and the insulating liquid, main tank 1 and/or electrical component 3 may also be subjected to thermal expansion and contraction during operation of the liquid-insulted electrical component. Thus, the volume of main tank 1, particularly the volume of insulating liquid that main tank 1 is capable of containing around electrical component 3, may be variable. As exemplarily shown in FIG. 2, the thermal expansion and contraction of main tank 1 is shown by dashed lines representing a "bulging" of main tank 1, while the thermal expansion and contraction of electrical component 3 is shown by dashed lines representing an expansion of coils of a transformer. The liquid levels $L_1$ and $L_2$ may therefore be affected by the thermal expansion and contraction of main tank 1 and/or electrical component 3.

According to an embodiment, which may be combined with other embodiments described herein, the method for measuring the quantity of liquid in the liquid-insulated electrical component may further include determining an actual main tank volume $V_{main,actual}$ using a predetermined model based on the values of the first pressure $P_1$ and the second pressure $P_2$.

Referring back to equation (7) above, the known main tank volume $V_{main}$ can be replaced with a variable for the actual main tank volume $V_{main,actual}$. Thus, determining the total mass of liquid in the liquid-insulated component using equation (8) below:

$$m_{total}=m_{main}+m_{exp}=V_{main,actual}\times(P_2-P_1)/(g\times H)+P_3\times(A_{exp}/g) \quad (8)$$

In order to further simplify the determination of the quantity of liquid in the liquid-insulated electrical component, the known constants of equation (8) can be generalized into predetermined parameters $\alpha$, $\gamma$. Such predetermined parameters $\alpha$, $\gamma$ could further include a conversion factor for converting into a generic total quantity of liquid value $Q_{total}$ which corresponds to a generalized quantity of liquid in the liquid-insulated electrical component. Thus, the generic total quantity of liquid $Q_{total}$ can be expressed as the following equation (B):

$$Q_{total}=\alpha\times P_3+\gamma\times V_{main,actual}\times(P_2-P_1) \quad (B)$$

where $\alpha$ and/or $\gamma$ are predetermined values.

Predetermined values $\alpha$, $\gamma$ may include a conversion factor such that the generic total quantity of liquid $Q_{total}$ corresponds to a specific quantity of liquid. For example, predetermined values $\alpha$, $\gamma$ may include a conversion factor for determining one of a total mass of liquid in the liquid-insulated electrical component, a height of liquid in the expansion tank, or a volume of liquid in the liquid-insulated electrical component. However, the present disclosure is not limited thereto. For example, when determining the total mass of liquid in the liquid-insulated component, predetermined values for determining total mass $\alpha_m$, $\gamma_m$ may be set such that:

$$\alpha_m=A_{exp}/g \text{ and } \gamma_m=1/(g\times H)$$

such that the total mass of liquid in the liquid-insulated component is determined with the following equation (9):

$$m_{total}=\alpha_m\times P_3+\gamma_m\times V_{main,actual}\times(P_2-P_1) \quad (9)$$

The actual volume of the main tank $V_{main,actual}$ is dependent upon the temperature of the insulating liquid, particularly the average temperature $T_{avg}$ of the liquid in main tank 1. Due to the varying geometries of main tank 1 and electrical component 3, a direct mathematical relationship between the volume of the main tank $V_{main,actual}$ and the average temperature $T_{avg}$ of the liquid in main tank 1 would be difficult to achieve. Therefore, a predetermined model including a calibration curve or lookup table may be used to determine the volume of the main tank $V_{main,actual}$.

Typically, accurate data relating to the properties of the insulating liquid, particularly the relationship between average density average density $\rho_{avg}$ and average temperature $T_{avg}$, can be obtained from the manufacturer of the insulating liquid or experimentally. The average density $\rho_{avg}$ of the insulating liquid in the main tank can be determined by equation (4) described above, and the average temperature $T_{avg}$ of the insulating liquid can be determined from said data. For example, a lookup table may be used for determining the average temperature $T_{avg}$ based on the calculated average density $\rho_{avg}$ of the insulating oil in main tank 1.

However, the determination can be further simplified by using a predetermined model of $V_{main,actual}$ based on the first pressure $P_1$ and the second pressure $P_2$. It has been shown above with equation (4) that the average density $\rho_{avg}$ of the insulating liquid in the main tank is dependent upon $\Delta P$, or the difference between second pressure $P_2$ and first pressure $P_1$. As the average density $\rho_{avg}$ of the insulating liquid in the main tank is dependent on the average temperature $T_{avg}$ of the liquid in main tank 1, the relationship between $T_{avg}$ and $\Delta P$ is bijective. Therefore, a predetermined model or lookup table for $V_{main,actual}$ which is based on $\Delta P$, or more specifically based on first pressure $P_1$ and second pressure $P_2$, can be used to more accurately and more reliably measure the quantity of liquid in the liquid-insulated electrical component.

The predetermined model for $V_{main,actual}$ may be predetermined experimentally. For example, the liquid-insulated electrical component may be required to be subjected to pre-certification testing prior to being installed and operated. During this pre-certification testing, the liquid-insulated electrical component is leak-free, and the predetermined model for $V_{main,actual}$ may be experimentally determined or calibrated using a known mass of insulating liquid and measuring the pressures $P_1$ and $P_2$ over a range of operating temperatures. A calibration curve, a lookup table or any other predetermined model may then be formulated specifically for the component being subjected to pre-certification testing, such that the values for $V_{main,actual}$ based on the pressures $P_1$ and $P_2$ can be accurately and reliably determined.

In order to implement a predictive maintenance approach to operating a liquid-insulated electrical component according to the present disclosure, it may be advantageous to compare the quantity of liquid measured by the methods described herein to one or more threshold values. Further, it may be advantageous to determine a rate of change of the quantity of liquid in the liquid-insulated electrical component, so that future maintenance can be adapted based on a predicted quantity of liquid.

According to an embodiment, which may be combined with other embodiments described herein, the method for measuring a quantity of liquid in the liquid-insulated electrical component further includes comparing the quantity of liquid to at least one predetermined threshold, and generating at least one signal when the quantity of liquid is above or below the at least one predetermined threshold.

The at least one predetermined threshold may be a predetermined value, or a predetermined threshold curved based on at least one of the pressures $P_1$, $P_2$ and $P_3$. For example, a threshold value may be determined such that a first threshold value corresponds to a threshold value when the liquid-insulated electrical component is in service, i.e. with the insulating liquid at a higher temperature, and a second threshold value corresponds to a threshold value when the liquid-insulated electrical component is not in service, i.e. when the insulating liquid is at a lower temperature. The at least one predetermined threshold may be predetermined during pre-certification testing of the liquid-insulated electrical component, such that the predetermined thresholds are tailored specifically for the component being certified.

The at least one signal may include at least one of the group containing a warning signal, a critical shut-off signal, and an overfill signal. For example, the at least one signal may be a warning signal which provides an operator with a visual or audible warning that a predetermined threshold has been crossed, signaling to the operator that preventative maintenance may be appropriate. As a further example, the at least one signal may be transmitted to another location, such as a remote server, providing remote maintenance personnel with a signal that a predetermined threshold has been crossed and that preventative maintenance may be appropriate. Further, the at least one signal may be a critical shut-off signal which provides an electrical signal to a circuit breaker configured for breaking supply power to the liquid-insulated electrical component in the case where a critical threshold is crossed, and the electrical component 3 is in critical danger of being exposed to air. Further, the at least one signal may be an overfill signal which indicates to an operator that an excessive amount of insulating liquid is present in the liquid-insulated electrical component, which may cause an overflow of liquid when the liquid-insulated electrical component is brought up to operating temperature.

According to an embodiment, which may be combined with other embodiments described herein, the method for measuring a quantity of liquid in the liquid-insulated electrical component further includes waiting for at least one predetermined time period after determining the quantity of liquid, determining at least one second quantity of liquid after the at least one predetermined time period, determining a rate of change of the quantity of liquid and evaluating if maintenance should be carried out based on the quantity of liquid and the rate of change of the quantity of liquid.

If the rate of change of the quantity of liquid is determined to be substantially close to zero, it can be determined that there is no leakage of insulating liquid, and regular maintenance schedules can continue to be followed. However, if a non-zero rate of change of the quantity of insulating liquid is determined, this indicates that a leakage is occurring or has occurred, and that maintenance schedules may need to be altered. A non-zero rate of change could be used to determine if a leakage is occurring or has occurred in many ways. For example, the rate of change of the quantity of liquid may be compared to at least one predetermined threshold. Alternatively, the time until the quantity of liquid becomes critical could be determined based on the actual quantity of liquid, a minimum allowable quantity of liquid and the rate of change of the quantity of liquid. A level of urgency may then be determined, indicating to an operator or maintenance personnel whether a maintenance activity should be prematurely scheduled to repair or re-fill the liquid-insulated electrical component, or whether operation can continue until the level of urgency reaches a level at which maintenance is appropriate.

According to a second aspect of the present disclosure, a liquid-insulated electrical component is provided. The liquid-insulated electrical component includes a main tank 1 containing an electrical component 3, an expansion tank 2 fluidly connected to the main tank 1, a first pressure sensor 5 provided in the main tank 1 and configured for measuring a first pressure $P_1$, a second pressure sensor 6 provided in the main tank 1 and configured for measuring a second pressure $P_2$, the second pressure sensor 6 provided at a height H above the first pressure sensor 5, a third pressure sensor 7 provided in the expansion tank 2 for measuring a third pressure $P_3$, and a determination unit configured for implementing the method for measuring a quantity of liquid according to embodiments of the first aspect.

Pressure sensors 5, 6, 7 may include any suitable pressure sensor for measuring a pressure of the insulating liquid within the liquid-insulated electrical component. Particularly, pressure sensors 5, 6, 7 may include at least one of a piezoelectric, capacitive, electromagnetic, optical or strain-gauge pressure sensor. However, the present disclosure is not limited thereto, and any pressure sensor which may generate an electrical signal corresponding to the pressure of a liquid may be used.

The determination unit for implementing the methods for measuring a quantity of liquid according to the embodiments described herein may include a central processing unit (CPU), a memory and, for example, support circuits. To facilitate determination of a quantity of liquid, the CPU may be one of any form of general purpose computer processor. The memory is coupled to the CPU. The memory, or a computer readable medium, may be one or more readily available memory devices such as random access memory, read only memory, floppy disk, hard disk, or any other form of digital storage either local or remote. The support circuits may be coupled to the CPU for supporting the processor in a conventional manner. These circuits include cache, power supplies, clock circuits, input/output circuitry and related subsystems, and the like. A software routine for determining a quantity of liquid according to the embodiments described herein, as well as predetermined values, models and other data, may be generally stored in the memory. The software routine, when executed by CPU, transforms the general purpose computer into a specific purpose determination unit that determines a quantity of liquid according to any of the embodiments of the present disclosure.

Alternatively, some of the method operations that are disclosed herein may be performed in hardware as well as by the software controller. As such, the embodiments may be implemented in software as executed upon a computer system, and hardware as an application specific integrated circuit or other type of hardware implementation, or a combination of software and hardware.

The liquid-insulated electrical component may further include at least one filtering means configured for filtering the electrical signals generated by the pressure sensors 5, 6, 7. The filtering means may be a separate filtering means provided for filtering at least one pressure signal. Alternatively, the filtering means may be integrated into the determination unit. The filtering means may include a low-pass filter, particularly an infinite impulse response (IIR) filter or a finite impulse response (FIR) filter.

Figure 3:
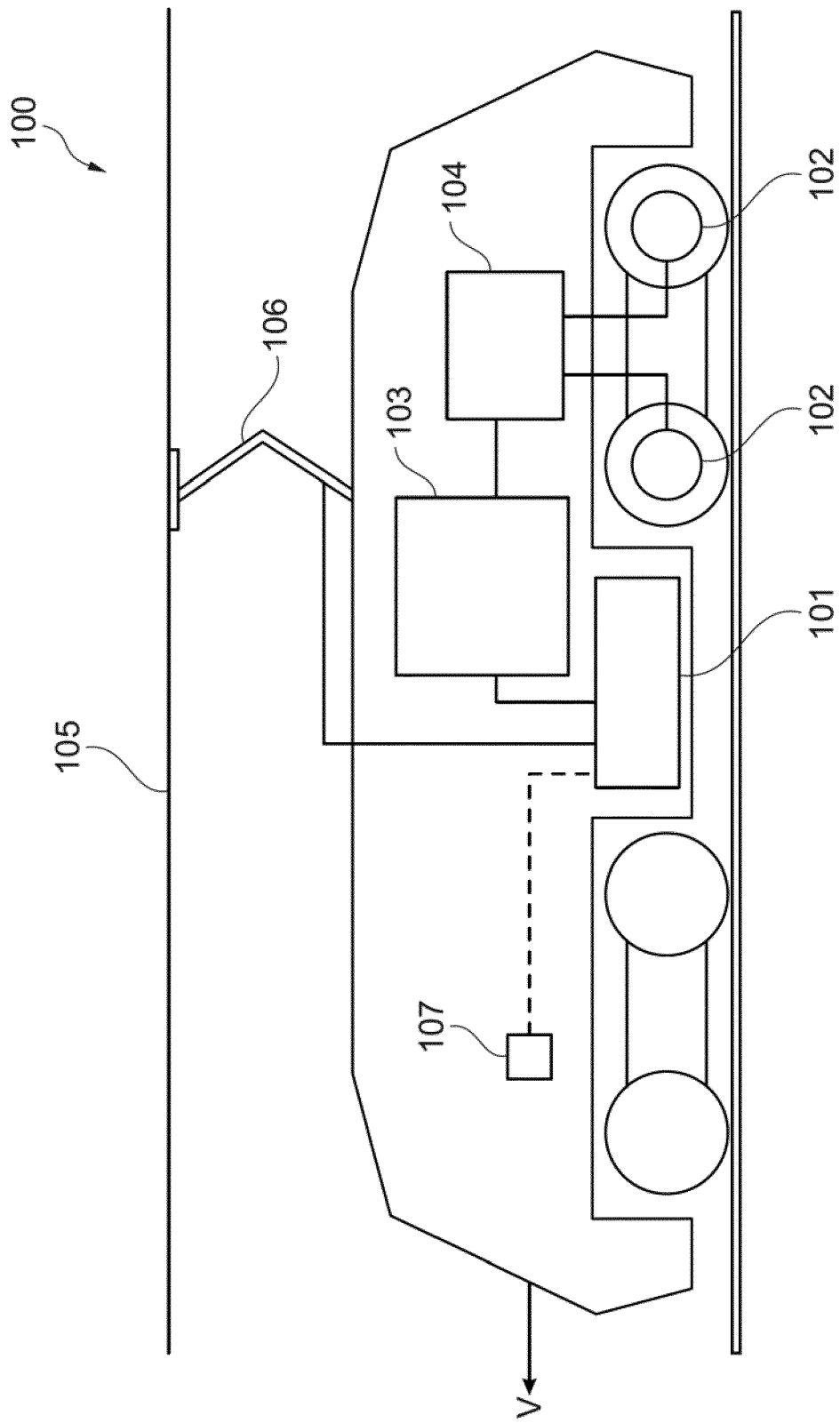
FIG. 3 is a schematic cross-sectional view of a railroad vehicle having a traction transformer according to aspects of the present disclosure.

Reference will now be made to FIG. 3, which shows a schematic view of a railroad vehicle according to the present disclosure. According to an embodiment, which may be combined with other embodiments described herein, the liquid-insulated electrical component is a transformer. Particularly, the liquid-insulated electrical component is a traction transformer for a railroad vehicle. According to a further embodiment, a railroad vehicle is provided, the railroad vehicle including a liquid-insulated electrical component according to the embodiments described herein.

As exemplarily shown in FIG. 3, the railroad vehicle 100 is provided with a traction transformer 101 according to embodiments described herein. Traction transformer 101 is electrically connected to a power source and is configured for converting a source voltage provided by the power source into a traction voltage suitable for providing to one or more traction motors 102. Traction motors 102 may be electrically connected to traction transformer 101 via rectifier 103 and inverter 104. Railroad vehicle 100 as exemplarily shown in FIG. 3 is shown to be powered by electrified overhead lines 105 and a pantograph 106; however, the present disclosure is not limited thereto. For example, railroad vehicle 100 may alternatively be provided with a motor-generator unit, for example a diesel engine connected to an electrical generator, which serves as the power source for supplying traction transformer 101 with a source voltage.

According to an embodiment, which may be combined with other embodiments described herein, the method for measuring a quantity of liquid in a liquid-insulated electrical component, particularly in a traction transformer for a railroad vehicle, is performed when the railroad vehicle is traveling at a constant velocity or when the railroad vehicle is stationary. Railroad vehicle 100 may be provided with a velocity measuring means 107 which is configured for measuring a velocity V of railroad vehicle 100. Velocity measuring means 107 may be electrically coupled to the determination unit of traction transformer 101 so that the determination unit is provided with a signal of the velocity of railroad vehicle 100.

Using the velocity signal provided by velocity measuring means 107, it can be determined whether a measurement of a quantity of liquid in traction transformer 101 should be carried out. When railroad vehicle 100 is in motion, the insulating liquid in traction transformer 101 may also be in motion such that a reliable measurement of the quantity of liquid becomes problematic. For example, if railroad vehicle 100 is not travelling at a constant velocity, i.e. accelerating or decelerating, the insulating liquid may slosh or surge within the main tank or the expansion tank of traction transformer 101. Therefore, a more reliable measurement of the quantity of liquid may be achieved by carrying out the measurement only when railroad vehicle 100 is travelling at a constant velocity. Particularly, the measurement of the quantity of liquid may be carried out when railroad vehicle 100 has been travelling at constant velocity for at least 10 seconds, more particularly at least 1 minute, even more particularly at least 5 minutes.

Reliably measuring a quantity of liquid could be made problematic due to vibration. When railroad vehicle 100 is in motion, traction transformer 101 may be subjected to vibration, which may cause an inaccurate or unreliably reading of one of the pressures $P_1$, $P_2$, $P_3$ measured by pressure sensors 5, 6, 7 in traction transformer 101. Therefore, a more reliable measurement of the quantity of liquid may be achieved by carrying out the measurement only when railroad vehicle 100 is stationary, i.e. at a velocity of zero. Particularly, the measurement of the quantity of liquid may be carried out when railroad vehicle 100 has been stationary for at least 10 seconds, more particularly at least 1 minute, even more particularly at least 5 minutes. For example, the measurement of the quantity of liquid may be carried out during scheduled stops on a route, during operator breaks, or when the railroad vehicle is stopped for an extended period, such as at a terminus.

Velocity measuring means 107 may be any means suitable for measuring a velocity V of railroad vehicle 100. Particularly, velocity measuring means 107 may include a global positioning system (GPS) receiver. More particularly, velocity measuring means 107 may include an inertial measurement device.

During operation, i.e. during conversion of the source voltage into the traction voltage, traction transformer 101 generates heat which is absorbed by the insulating liquid and other components of traction transformer 101. The heat generated by traction transformer 101 may heat the insulating liquid in a localized fashion, such that a non-uniform temperature distribution is generated, and an accurate and reliable measurement the quantity of liquid may be more problematic to achieve. Therefore, a more reliable measurement of the quantity of liquid may be achieved by carrying out the measurement only when the energy output of traction transformer 101 is low or substantially zero. In this state, traction transformer 101 is not in operation to convert the source voltage into the traction voltage, and a significantly lower amount of heat is being generated. For example, when traction transformer 101 is not in operation, the heat generated by no-load losses may be less than 10% of the heat generated by load losses when traction transformer 101 is operating at nominal power. Thus, localized heating of the insulating liquid is significantly reduced and the density of the insulating liquid is more homogeneous when the traction transformer 101 is in this state, leading to a more reliable and accurate measurement of the quantity of liquid.

While the foregoing is directed to aspects and embodiments of the disclosure, other and further embodiments of the disclosure may be devised without departing from the basic scope thereof, and the scope thereof is determined by the claims that follow.

The invention claimed is:

1. Method for measuring a quantity of a liquid in a liquid-insulated electrical component comprising a main tank and an expansion tank fluidly connected with the main tank, the method comprising:
   measuring a first pressure of the liquid at a first point in the main tank;
   measuring a second pressure of the liquid at a second point in the main tank the second point being at a height above the first point;
   measuring a third pressure of the liquid at a third point in the expansion tank;
   determining the quantity of liquid in the liquid-insulated electrical component based on the first pressure the second pressure, the third pressure, and a function dependent on the mass of liquid in the expansion tank and an average density of liquid in the main tank;
   comparing the quantity of liquid to at least one predetermined threshold; and
   generating at least one signal in response to the quantity of liquid being above or below the at least one predetermined threshold, the signal configured to automatically perform a corrective action with respect to the electrical component.

2. Method according to claim 1, wherein the first point is at a base of the main tank.

3. Method according to claim 1, wherein the quantity of liquid is based on at least one of a total mass of liquid, a mass of liquid in the expansion tank, a mass of liquid in the main tank, and an average density of liquid in the main tank.

4. Method according to claim 1, wherein the quantity of liquid is determined according to the following equation:

$$Q_{total} = \alpha \times P_3 + \beta \times (P_2 - P_1)$$

where $\alpha$ and $\beta$ are predetermined values.

5. Method according to claim 1, further comprising filtering at least one of the first pressure, the second pressure, the third pressure, and the quantity of liquid using a low-pass filter.

6. Method according to claim 1, further comprising determining an actual main tank volume using a predetermined model based on values of the first pressure and the second pressure.

7. Method according to claim 6, wherein the quantity of liquid is determined according to the following equation:

$$Q_{total} = \alpha \times P_3 + \gamma \times V_{main,actual} \times (P_2 - P_1)$$

where $\alpha$ and $\gamma$ are predetermined values.

8. Method according to claim 1, wherein the liquid-insulated electrical component is mounted to a railroad vehicle.

9. Method according to claim 8, wherein the method is performed when the railroad vehicle is traveling at a constant velocity or when the railroad vehicle is stationary.

10. Method according to claim 1, further comprising:
    waiting for at least one predetermined time period after determining the quantity of liquid;
    determining at least one second quantity of liquid after the at least one predetermined time period;
    determining a rate of change of the quantity of liquid; and
    evaluating if and when maintenance should be carried out based on the quantity of liquid and the rate of change of the quantity of liquid.

11. A liquid-insulated electrical component comprising:
    a main tank containing the electrical component;
    an expansion tank fluidly connected to the main tank;
    a first pressure sensor provided in the main tank and configured for measuring a first pressure of a liquid;
    a second pressure sensor provided in the main tank and configured for measuring a second pressure of the liquid, the second pressure sensor provided at a height above the first pressure sensor;
    a third pressure sensor provided in the expansion tank for measuring a third pressure of the liquid; and
    a determination unit configured for implementing the method for measuring a quantity of liquid according to claim 1.

12. The liquid-insulated electrical component of claim 11, wherein the liquid-insulated electrical component is a transformer.

13. The liquid-insulated electrical component of claim 11, wherein the liquid-insulated electrical component is a traction transformer for a railroad vehicle.

14. Method according to claim 1, wherein the second point is at a top of the main tank.

15. Method according to claim 1, wherein the third point is at a base of the expansion tank.

16. Method according to claim 1, further comprising filtering at least one of the first pressure, the second pressure, the third pressure, and the quantity of liquid using at least one of an infinite impulse response (IIR) filter and a finite impulse response (FIR) filter.

17. Method according to claim 1, wherein the liquid-insulated electrical component is a traction transformer of a railroad vehicle.

18. Method according to claim 1, wherein the signal is further configured to cause a circuit breaker to automatically break supply power to the liquid-insulated electrical component.

19. Railroad vehicle comprising a liquid-insulated electrical component comprising:
    a main tank containing the electrical component;
    an expansion tank fluidly connected to the main tank;
    a first pressure sensor provided in the main tank and configured for measuring a first pressure of a liquid;
    a second pressure sensor provided in the main tank and configured for measuring a second pressure of the liquid, the second pressure sensor provided at a height above the first pressure sensor;
    a third pressure sensor provided in the expansion tank configured for measuring a third pressure of the liquid; and
    a determination unit configured to:
      measure a first pressure of the liquid at a first point in the main tank;
      measure a second pressure of the liquid at a second point in the main tank, the second point being at a height above the first point;
      measure a third pressure of the liquid at a third point in the expansion tank; and
      determine a quantity of liquid in the liquid-insulated electrical component based on the first pressure, the second pressure, the third pressure, and a function dependent on the mass of liquid in the expansion tank and an average density of liquid in the main tank;

compare the quantity of liquid to at least one predetermined threshold; and generate at least one signal in response to the quantity of liquid being above or below the at least one predetermined threshold, the signal configured to automatically perform a corrective action with respect to the electrical component.

20. Railroad vehicle according to claim 19, wherein the quantity of liquid is determined according to the following equation:

$$Q_{total} = \alpha \times P_3 + \beta \times (P_2 - P_1)$$

where $\alpha$ and $\beta$ are predetermined values.

* * * * *